United States Patent
Von Tschammer et al.

(10) Patent No.: US 8,207,267 B2
(45) Date of Patent: Jun. 26, 2012

(54) POLYOLEFIN COMPOSITION INTENDED FOR PRODUCING A COVER FOR HOUSING A MOTOR VEHICLE SAFETY AIRBAG

(75) Inventors: Alexis Von Tschammer, Corenc (FR); Daniel Milesi, Voiron (FR)

(73) Assignee: Multibase SA, St. Laurent du Pont (FR)

( * ) Notice: Subject to any disclaimer, the term of this patent is extended or adjusted under 35 U.S.C. 154(b) by 233 days.

(21) Appl. No.: 11/813,020

(22) PCT Filed: Dec. 22, 2005

(86) PCT No.: PCT/GB2005/005036
§ 371 (c)(1), (2), (4) Date: Mar. 6, 2008

(87) PCT Pub. No.: WO2006/070179
PCT Pub. Date: Jul. 6, 2006

(65) Prior Publication Data
US 2008/0150261 A1    Jun. 26, 2008

(30) Foreign Application Priority Data
Dec. 30, 2004 (EP) .................................. 04293175

(51) Int. Cl.
*C08L 23/14* (2006.01)
*C08L 9/06* (2006.01)
*C08L 53/02* (2006.01)

(52) U.S. Cl. ............ 525/98; 525/88; 525/191; 525/240; 525/241; 525/383; 280/728.3

(58) Field of Classification Search ............... 280/728.3; 524/528; 525/191, 192, 240, 241, 383, 387, 525/88, 95, 98
See application file for complete search history.

(56) References Cited

U.S. PATENT DOCUMENTS

| | | | |
|---|---|---|---|
| 4,716,202 A * | 12/1987 | Strauss | .......................... 525/370 |
| 5,596,042 A | 1/1997 | Itoh et al. | |
| 6,087,431 A | 7/2000 | Uchida et al. | |
| RE36,898 E * | 10/2000 | Sawada et al. | .................. 428/43 |
| 6,218,474 B1 | 4/2001 | Valligny et al. | |
| 2002/0037954 A1 | 3/2002 | Ohkawa et al. | |
| 2002/0151653 A1 | 10/2002 | Jeong et al. | |

FOREIGN PATENT DOCUMENTS

| | | |
|---|---|---|
| EP | 0774489 AI | 5/1997 |
| EP | 0872517 A1 | 10/1998 |
| WO | WO9722665 A1 | 6/1997 |
| WO | WO9854260 A1 | 12/1998 |
| WO | WO0224803 A1 | 3/2002 |
| WO | WO-2004091982 A1 * | 10/2004 |

OTHER PUBLICATIONS

Utracki, L.A. Polymer Blends Handbook vols. 1-2 Kluwer Academic Publishers, Norwell, MA 2002 pp. 49-53.*
English language abstract for WO9722665 extracted from espacenet.com, Feb. 29, 2008.

* cited by examiner

*Primary Examiner* — Irina S Zemel
*Assistant Examiner* — Jeffrey Lenihan
(74) *Attorney, Agent, or Firm* — Howard & Howard Attorneys PLLC

(57) ABSTRACT

A partly cross-linked thermoplastic elastomer polyolefin composition intended to be converted by any plastics processing technique into a molded part, such as a cover for housing a vehicle's safety airbag, comprises an olefin polymer of polypropylene type, at least one copolymer of ethylene-alpha-olefin type, at least one cross-linking agent and a free radicals formation agent characterized in that a) the olefin polymer of polypropylene type is chosen from the group of polypropylene/ethylene or polypropylene/α-olefin copolymers and selected from those having an impact resistance of at least 40 kJ/m² when measured using the notched Izod impact resistance test at 23° C. in accordance with ISO standard 180.

b) at least one copolymer of the ethylene-α-olefin type is selected from the group formed by those having a density at least equal to 0.870 g/cm³ in accordance with ISO standard 1183.

c) at least one thermoplastic elastomer is introduced into the composition.

19 Claims, No Drawings

POLYOLEFIN COMPOSITION INTENDED FOR PRODUCING A COVER FOR HOUSING A MOTOR VEHICLE SAFETY AIRBAG

RELATED APPLICATIONS

This application claims priority to and all the advantages of International Patent Application No. PCT/GB2004/005036, filed on Dec. 22, 2005, which claims priority to European Patent Application No. EP 04293175.8, filed on Dec. 30, 2004.

The invention concerns a thermoplastic polyolefin composition allowing the production of parts and components that must resist low temperature shocks.

More specifically, the invention concerns a partly cross-linked thermoplastic polyolefin elastomer composition intended to be transformed by any plastics processing technique, but in particular by injection, into a moulded part such as, for example, a cover for housing a motor vehicle safety airbag.

More specifically such a moulded part is intended to act as a cover to be used in the steering column, or on a dashboard, or on a door panel or any other area of a motor vehicle able to house such an active safety device as a safety airbag.

When this moulded part is in particular a cover for holding a safety airbag of appropriate geometry, the said cover must meet a large number of requirements.

This cover must be able to be injected at high production rates and at high shear rates due to the very particular geometry of the part.

To obtain higher rates requires different levels of performance for the thermoplastic composition intended to be used in the preparation of the cover, such as a fluidity under different shear rates particularly during the stage of filling moulds but also in the absence of stickiness in the mould which could negatively effect the release properties of part once moulded.

In fact, a weakened or lower strength zone is provided on the internal face of this cover's wall, this zone being in the shape of an 'H' or an 'I' or a "Y" or a "U" and intended to be easily opened upon deployment of the airbag following an impact sustained by the vehicle.

This lower strength zone generally has the form of a rupture line or notch and is most often achieved by slimming down the internal side of the skin, for example using a hot knife or by means of a laser. However, this thinner notch area may be achieved directly when injection moulding, with such a slimming down quite obviously forming an obstruction to the flow of the molten material. The thicknesses of this area vary from 0.1 to 1.0 mm whilst the thickness of the cover wall is of the order of some 10 mm.

This cover must also have a certain rigidity to allow it to fit on, for example, a steering wheel.

This cover must moreover be regarded as a so-called appearance part. Paint is generally applied to the cover with the aim of masking aesthetic defects that might appear on the surface of the injected part at the visible skin level. These defects may be the result of change in lustre or reveal the presence of run lines. These visual defects arise from injection, particularly at the rupture lines and this is in spite of the optimisation of material flows and injection points. However, this same thermoplastic composition can also be used for applications that will not be painted and it will then be far more difficult to achieve a good external appearance without the presence of this coat of paint.

Moreover, despite temperature changes in the vehicle's passenger compartment, this lower strength zone must be able to be retain a long term decorative appearance; the surfaces must remain soft and supple and it must be able to retain sufficient mechanical properties that do not alter, particularly losing its shape and stretching or even cracking.

Finally the performance conditions of the cover during use and the operation of a motor vehicle safety airbag are particularly critical. Each cover design, as designed by equipment manufacturers and car builders, is different; however, under the most extreme practical conditions the thermoplastic material comprising this injected part should resist an actual temperature of −35° C. whilst also being able to withstand with changes a temperature of +85° C. Consequently, this implies that the covers for testing will actually be placed in these temperature conditions and they will be tested at these actual temperatures. Thus the covers are placed in a conditioning chamber at the above-mentioned temperatures; when the cover has actually reached these temperatures, it is then tested under real conditions to verify its correct operation. This correct operation implies that no piece of plastic must break off during the release of the airbag (explosion), since it is feared that a detached plastic piece could potentially injure the vehicle occupant. The cover must therefore tear and open in the sector foreseen to this end, often following this H or I shape, with the opening of the flaps taking place in a pre-determined manner in order to allow the safety airbag to be properly deployed. It is a matter of ensuring that the bag is fully deployed in a precise time interval: if the bag is deployed too quickly, the occupant could hit the bag before it is actually inflated; however, if the bag is deployed too slowly, then there is a risk of the driver hitting the steering column.

If the vehicle strikes an obstacle with an impact force sufficient to make sure that the airbag deployment mechanism is triggered, the insert acting as a cover must be capable of being opened in a few milliseconds, and to do so by rupturing following the notches designed to this end and which form integral parts of the moulded part. During this deployment the cover plays an important role by retaining the airbag mechanism whilst remaining attached to the steering wheel with respect to the part left behind if it is a cover concealing the driver's safety airbag, or by ensuring the door's integrity is maintained if it constitutes the plate concealing the safety airbag on the vehicle sides.

These use requirements are expressed as the functional need for good impact strength at low temperature for such compositions and particularly the need for a ductile rupture. It should also be borne in mind that increasingly demanding safety stipulations mean that this performance is required at lower and lower temperatures.

In addition, over the long term, the skin may lose its suppleness and become fragile, particularly around the rupture line, due to the repeated effect of the thermal variations to which the vehicle's passenger compartment is subjected.

Thermal performance tests are generally conducted for 400 hours at 107° C. Accelerated tests simulating 10 years of ageing and thus of life cycle are likewise well known for such motor vehicle passenger compartment components. Finally, other tests include chemical resistance, ultra-violet radiation resistance, response to risks of changes in colour, as well as to the risks of the formation of condensation forming on the windscreen, this condensation resulting from the deposition of volatile organic materials contained in the composition comprising the passenger compartment parts subjected to a temperature increase.

Compositions allowing the production of covers for housing a motor vehicle safety airbag, particularly by injection, are already known.

The majority of compositions are of the thermoplastic elastomer type with a chemically cross-linked rubber phase, generated by dynamic vulcanisation. Co-polyester type elastomers are also possible.

Nevertheless, costs considerations mean that compositions that are mostly polyolefins are preferred.

Document U.S. Pat. No. 6,087,431 discloses a thermoplastic elastomer olefin composition obtained from a mixture comprised of (1) 100 parts by weight of an olefin elastomer comprising ethylene and at least one α-olefin with 6 to 12 carbon atoms, and having an α-olefin copolymerisation ratio of 20 to 30% by weight, a density of 0.8 to 0.9 g/cm$^3$ and a molecular weight distribution (Mw/Mn) of less than 3.0 when determined by gel phase chromatography techniques, (2) 5 to 90 parts by weight of a propylene polymer, and (3) 5 to 250 parts by weight of an oil for rubber, with the mixture being cross-linked by a radical initiator or by both a radical initiator and a cross-linking promoter.

However, such a composition no longer meets the new requirements for the absence of volatile organic components having the capability of exuding on the surface of the item moulded from this composition when kept for a long time at high temperatures, as happens with a car left in full sunlight, with the aforesaid compositions being deposited by sublimation on the windscreen, changing its transparency.

Document WO0224803 discloses a thermoplastic elastomer composition with modified rheology obtained from a mixture comprised of at least a first polyolefin with the elastomeric properties of the ethylene and α-olefin copolymer type and a second polyolefin of the polypropylene homopolymer or ethylene propylene copolymer type associated with a peroxide type cross-linking agent and a free radicals former type coagent; with the composition being subjected to hot mixing in order to improve the composition's visco-elastic properties, particularly its rheology. The main cross-linking or vulcanising system is actually supplemented by a secondary system acting as a chain cutter as regards the polypropylene component and this is in order to allow satisfactory implementation behaviour for such a composition to be achieved, particularly in processes such as sheet extrusion and heat moulding. Other additives are possible in such compositions, particularly mineral fillers, stabilisers, plasticisers, bulking or other agents according to the types of compositions to be obtained and standards to be met. This composition has the advantage of being able to be used easily, including by injection and including when the walls of the object for moulding are particularly thin whilst allowing the item to have a good surface appearance. However, such a composition is not suited to quite specific use performance situations, since it does not allow production of parts able to withstand the most critical notch impact resistance tests at −45° C.

US 2002/0151653 describes a thermoplastic resin composition for use as a skin material for automobile interior parts comprising a base composition of polypropylene, an olefin based copolymer rubber, a processing oil and a high density polyethylene resin, in combination with an organic peroxide cross-linking agent to prevent hyper-degradation of the polypropylene resin and as a free radical stabilizer, and polytetraflourorethylene resin.

US2002/0037954 describes a polypropylene resin composition comprising:
(i) a polypropylene based composition comprising polypropylene, talc and optionally an ethylene-α-olefin copolymer rubber and/or an aromatic rubber vinyl containing rubber; and
(ii) a pigment masterbatch.

This composition does not contain any form of cross-linking agent.

EP0774489 describes a thermoplastic resin composition comprising
(A) a polypropylene/ethylene block copolymer
(B1) a mixture of ethylene/butane random copolymer resins
(B2) an ethylene/octane random copolymer and an ethylene/propylene copolymer
(C) a polyethylene moiety-(ethylene/butane random elastomer moiety-polyethylene moiety or a polyethylene moiety-(-ethylene/butane random elastomer moiety) and
(D) talc,
Each of (A), (B1), (B2), (C) and (D) have specific parameter requirements.

U.S. Pat. No. 5,596,042 describes an olefin thermoplastic elastomer. WO 97/22665 relates to a powdered thermoplastic polyolefin composition with resilient properties. EP 0872517 relates to a thermoplastic elastomer composition. WO98/54260 describes a low modulus thermoplastic olefin composition.

The invention consequently has the aim of compensating for the drawbacks mentioned above by offering a composition allowing an excellent surface appearance and a significant improvement in notched impact resistance performance when cold, i.e. having ductile rupture, but a rupture nevertheless without losing anything for all that in terms of rigidity modulus and high temperature resistance, to be obtained from the aforesaid composition and for an injection-moulded part.

The invention has as its first object the creation of a polyolefin composition intended to be transformed by any plastics processing technique, but preferably by injection moulding, into an insert or cover type part for housing a motor vehicle safety airbag, that must withstand an impact at low temperature without necessarily splitting, i.e. having a ductile type rupture and maintaining its shape at high temperature.

The invention has as another object the creation of a partly cross-linked thermoplastic elastomer polyolefin composition intended for producing a cover fully meeting the specification of motor vehicle manufacturers, in particular having to withstand temperatures of 107° C. and having a high rigidity modulus without sacrificing the characteristics of rupture ductility to notched impact at low temperature.

The invention has as another object the creation of a partly cross-linked thermoplastic elastomer polyolefin composition intended for producing a cover that has attractive appearance properties in order to allow its possible use without painting and more particularly offering a sufficiently broad range of use by injection to obtain moulded parts free of material run lines, regular surface states, homogenous shrinkage not shown by temperature cycles, particularly during painting, and to do so in spite of high moulding rates.

The invention has, as another object the creation of a partly cross-linked thermoplastic elastomer polyolefin composition for making an insert, in particular a cover which can be made at high moulding rates, that is to say having short cycle times resulting from short injection and release times without being effected by any risk of stickiness to the mould.

To this end the invention concerns a partly cross-linked thermoplastic elastomer polyolefin composition intended to be utilised initially by any blending technique in its molten state and under shearing force before being transformed by plastics processing moulding techniques, and preferably by injection moulding into an insert in particular a cover type part for housing a motor vehicle safety airbag, with the said composition comprising an olefin polymer of polypropylene type, at least one copolymer of ethylene-α-olefin type, at least one cross-linking agent and a free radical initiator characterised in that a) the at least one olefin polymer of polypropylene type is chosen from the polypropylene/ethylene or polypropylene/α-olefin copolymers group and selected from those having an impact resistance of at least 30 kJ/m$^2$ when measured using the notched Izod impact resistance Test at 23° C., in accordance with ISO standard 180;

b) the at least one ethylene type copolymer of the ethylene-α-olefin type is selected from the group of those having a maximum density of 0.870 g/cm$^3$, in accordance with ISO standard 1183;

c) at least one thermoplastic elastomer is introduced d) optionally a polymer of the high density polyethylene type is added Since a high rigidity modulus for the composition comprising the cover must be sought and a resistance to high temperatures is necessary, different types of high melting point thermoplastic olefin polymers can be used, such as polypropylenes in their homopolymer or copolymer form; however, insofar as the inclusion of impact resistance performance when cold, the choice is preferably oriented to polypropylene copolymers, and preferably to olefinic polymers of the high density polyethylene type which are conceivable although they have lower melting points than polypropylene Nevertheless, the addition of thermoplastic elastomers proves to be essential in order to meet the requirements of low hardness and ductile rupture at low temperature.

The state of the art indicates that, of the polyolefins, those having a low crystallinity should be chosen out of preference. In fact, visco-elastic behaviour and suppleness of the polymer material go hand in hand since these two properties are linked to the crystalline, semi-crystalline or amorphous state of the aforesaid polymer material.

The state of the art likewise indicates that partial cross-linking accompanies the formation of a network between the crystalline parts and the amorphous parts, likewise changing the lengths of chains and thus creating the morphological conditions to obtain a real thermoplastic elastomer. However, ductile rupture performance, including at very low temperatures, is not achieved by this single approach.

Finally, changing the rheological characteristics of such compositions is called for in order to combine fluidity and low viscosity behaviour at high shearing rates whilst maintaining cohesion of the material in the molten state. Such characteristics are desired with the aim of retaining appearance properties; these are dependent upon sensitivities to polymer chain orientations that are too strong when subjected to high injection shearing rates, then to the possible release of stresses set during thermal cycles, for example.

Polypropylene Polymer

According to the invention, propylene polymers form the main element by quantity of the partly cross-linked thermoplastic elastomer olefin composition.

In Accordance with the present invention the polypropylene polymer is a semi-crystalline isotactic copolymer of the sequential block type or random type whose sequences are constituted by propylene and by ethylene or α-olefins from $C_4$-$C_{12}$ such as 1-butene, 1-pentene, 1-hexene, 1-octene and methyl pentene.

The semi-crystalline copolymer is preferably a copolymer of propylene and ethylene containing small quantities of ethylene, generally between 2% and 5% by weight.

The polypropylene/ethylene or polypropylene/α-olefin copolymer is selected from those having an impact resistance of at least 30 kJ/m$^2$ when measured using the notched Izod impact resistance test at 23° C. in accordance with ISO standard 180.

A homopolypropylene polymer cannot be envisaged due to such a material's low impact resistance at low temperature.

The fluidity index of propylene-ethylene copolymer and/or propylene-α-olefin copolymer in accordance with the present invention is in the range of from 0.1 to 100 g/10 minutes (under a load of 2.16 kilograms at 230° C. in accordance with ASTM standard 1238). The chosen copolymer of the propylene type preferably has a fluidity index of between 0.5 and 50 g/10 minutes. Above 50 g/10 minutes, the thermal resistance and mechanical resistance of the thermoplastic elastomer composition will be insufficient, whilst below 0.5 g/10 minutes, the fluidity and use capability will be too far reduced.

At least one copolymer chosen from these propylene based copolymers is added in the proportion of 45% to 80% by weight, and preferably 50% to 70% by weight in comparison with the total formulated composition. In the description below, all percentages for various additives, such as cross-linking agents, coagents, stabilising agents, fillers, and any other additives are given in % by weight compared with the complete composition. Below 45% by weight, the composition's fluidity and capability of use, as well as its rigidity, will be diminished too sharply, whilst above 80% by weight, the composition's flexibility will be manifestly insufficient, particularly at low temperatures.

Ethylene Based A-Olefin Copolymer

The ethylene-α-olefin copolymer in accordance with the invention appears to be the second largest component in quantity terms of the partly cross-linked thermoplastic elastomer composition is a copolymer comprising ethylene as the major co-monomer and at least one α-olefin preferably having 3 to 12 carbon atoms as a secondary co-monomer. α-olefins having 3 to 12 carbon atoms include, for example, butene, 1-hexene, 1-methylpentene, 1-heptene, 1-octene, 1-nonene, 1-decene, 1-undecene and 1-dodecene.

Examples of comonomers that reduce crystallinity which can be used in the preparation of an ethylene based copolymer in accordance with the present invention also include ethylene-α-olefin comonomers, or an ethylene comonomer the latter being made by mixing with the ethylene-α-olefin copolymer. The comonomer is chosen from the group comprising vinyl acetate, acrylic acid, methacrylic acid, methyl acrylate, methyl methacrylate, ethyl acrylate and ethyl methacrylate; however, α-olefins give rise to individual behaviours.

According to the invention olefin copolymers of the ethylene-butene and the ethylene-octene type are preferably chosen. These are preferably produced by a well-known catalyst of the metallocene type in accordance with so-called "constrained geometry" technology and have the form of substantially linear polymers. These polymers are also called very low-density linear polyethylenes. These α-olefin copolymers are obtained by polymerisation of ethylene with butene or octene in the presence of a catalyst belonging to the family of those termed as having "constrained geometry" acting on a specific site and differing chemically in that from those of classic metallocene type catalysts.

Generally co-monomers may be present at different rates, thereby increasing or decreasing the crystallinity of the resulting materials and thus their densities and consequentially, their visco-elastic properties. In fact a sufficiently viscoelastic character is necessary to obtain the ductile rupture performance at very low temperatures. Ethylene-α-olefin copolymers for use in this invention preferably have a fluidity index in the range from 0.05 to 50 g/10 minutes, under a load of 2.16 kilograms at 190° C., when measured in accordance with method ASTM D-1238, and more preferably from 0.2 to 20 g/10 minutes.

The ethylene-α-olefinic copolymer for use in this invention has a sufficiently low density corresponding to a very low crystallinity. Density is chosen at a maximum value of 0.870 g/cm$^3$ when measured in accordance with method ASTM D-792. There is a correlation between density, crystallinity and the glass transition temperature value. The ethylene-α-olefin copolymers having the lowest glass transition temperatures will be those having the lowest crystallinity and thus the lowest density, and do so whatever the α-olefin comonomer selected, which preferably comprise butene or octene. Such olefinic elastomers have glass transition temperatures lower than −55° C., for total rates of crystallinity expressed as a percentage of more than 15% when measured by differential thermal analysis.

It should be noted that
the selected ethylene-butene copolymers resulting from such copolymerisation processes have the characteristic of having a lower crystallinity than that of ethylene-octene copolymers of identical density reinforcing this sought-for visco-elasticity capability peculiar to elastomeric behaviour.
It should be noted that these copolymers have the capacity to be partly cross-linked in the presence of cross-linking agents and they then enter a plastomeric type state, thus borrowing from both thermoplastics and elastomers.

The α-olefin copolymer in accordance with the invention is added at the proportion of 25% to 50% by weight of the composition and preferably 30% to 45% by weight of ethylene-butene copolymer or ethylene-octene copolymer.

Above 50% by weight of the composition, the rigidity modulus will be reduced sharply. Below 25% impact resistance at very low temperatures, measured on the notched test-piece, is low.

Thermoplastic Elastomers

According to the invention, and in an utterly surprising manner, the addition of a specific thermoplastic elastomer in particular proportions to the mixture produced from a polypropylene copolymer combined with a selected ethylene-α-olefin copolymer most preferably ethylene-butene or ethylene octene copolymer obtained by polymerisation of ethylene with butene or octene in the presence of a catalyst belonging to the so-called "constrained geometry" family, acting on a specific site, allows a composition to be produced which, when at least partly cross-linked and rheologically modified, particularly as regards its polypropylene component, by a free radical initiator coagent, by extrusion and shearing at high temperatures, and once used in a cover by injection techniques, offers excellent notched impact and very low temperature ductile rupture performance, whilst providing satisfactory thermal resistance and to do so with all other properties remaining unchanged in comparison with other thermoplastic elastomer polyolefin compositions. In addition, such a composition has such use characteristics allowing parts with excellent surface appearance to be obtained.

These characteristics of high notch impact resistance and ductile rupture at very low temperatures are provided by the presence of this specific thermoplastic elastomer, specifically for use as an impact modifier According to the invention, the partly cross-linked thermoplastic olefin elastomer composition contains at least one specific thermoplastic elastomer chosen in such a manner that the composition's physical properties are reinforced in respect of resistance to notched impact at low temperature and capacity to have a ductile rupture without any loss whatever as regards rigidity modulus.

The impact modification additive is preferably chosen from the group formed by the ethylene-propylene-diene (EPDM), styrene-butadiene-styrenes (SBS), styrene-ethylene-butylene-styrenes (SEBS), styrene-butadiene rubbers (SBR), styrene-isoprene-styrenes (SIS), polyolefin-based thermoplastic elastomers, particularly polypropylenes (homopolymers) with amorphous and semi-crystalline blocks and propylene/ethylene or α-olefin copolymers with amorphous and semi-crystalline blocks of styrene-(ethylene/propylene) (SEP), styrene-b-(ethylene/propylene)styrene (SEPS), styrene-(ethylene/butylene)-styrene (SEBS) styrene-(ethylene-ethylene/propylene)-styrene (SEEPS) type.

Such specific thermoplastic elastomers include block copolymers comprising a block A of polymer composed principally of at least one aromatic composition of vinyl type and a block B of polymer composed principally of at least one conjugated diene composition, as well as block copolymers obtained by hydrogenation of block copolymers and ethylene polymers with a low molecular weight.

The specific elastomers include block copolymers comprising a block A of polymer composed principally of at least one vinylaromatic type composition and a block B of polymer composed principally of at least one conjugated diene composition or of block copolymers obtained by hydrogenation of these block copolymers and ethylenic polymers of lesser molecular weight.

The copolymer block comprising at least one vinylaromatic composition contains at least 50% by weight of the aromatic block of vinyl type and or vinyl homopolymer block.

The copolymer block composed mainly of at least one conjugated diene composition contains at least 50% by weight of the conjugated diene composition and/or homopolymer block of conjugated diene composition.

The vinylaromatic composition is chosen from the group of styrenes, methyl-styrenes, 1,3-dimethylstyrenes, p-tert-butyl-styrenes. Styrene is chosen out of preference.

The conjugated diene composition constituting the copolymer block is chosen from the group of butadienes, isoprenes, 1,3-pentadienes and 2,3-dimethyl-1,3-butadienes. Butadiene and isoprene singly or blended together are chosen out of preference. Such thermoplastic elastomers are traditionally known by the name SBS (styrene butadiene styrene) or SIS (styrene isoprene styrene).

The styrene block copolymers may be hydrogenated at intermediate block level and then become block copolymers better known under the names SEBS, (styrene ethylene-butadiene-styrene), SEPS (styrene-ethylene-propylene-styrene) and SEP (styrene-ethylene-propylene).

The hydrogenated block copolymers are obtained amongst other ways by hydrogenation of the aforementioned block copolymers, in particular SBS and SIS.

These polymers may be of linear type, A-B-A, such as for example styrene-butadiene-styrene, or of radial type, (A-B)n (with n>2), or of bi-block type A-B.

According to the invention, styrene-butadiene-styrene are preferably chosen.

The block copolymers whose structures have been mentioned above are preferably chosen from those having an average molecular weight of at least 20,000 g/mole, and more preferably between 30,000 g/mole and 200,000 g/mole.

When present in the composition in accordance with the invention such a block copolymer provides excellent mechanical characteristics. In particular impact at very low temperatures measured on a notched test-piece and ductile rupture are well above values any thermoplastic elastomer could achieve, without any loss of rigidity and this is in part due to its capability for partial cross-linking right in the interior of the composition.

Thus the block copolymer of the composition according to the invention acts as an integral and interdependent component of the composition. Due to the dynamic cross-linking reaction achieved during blending in the extruder at high temperature and under extruder shearing conditions, the block copolymer develops its capacity for interaction in the network formed by the propylene copolymer, combined with the selected ethylene-α-olefin copolymer on account of the fact that it becomes a partially dynamically vulcanised thermoplastic elastomer and that the same occurs for the α-olefin ethylene copolymer becoming an olefin thermoplastic elastomer that is likewise partly cross-linked.

The block copolymer, impact modification additive, in accordance with the invention, is added in the proportion of 1% to 15% by weight of the composition.

Above 15% by weight of the composition, the possibility for cross-linking of the composition will be reduced, but most of all the rigidity modulus will be sharply lowered. Below 1%, the gain in impact resistance at very low temperatures measured on the notched test-piece is not significant.

High Density Polyethylene

According to the invention a high density polyethylene may be added into the composition in the proportions of from 0% to 40% by weight of the total composition and when present preferably comprises between 5% and 30% by weight of the total composition. Such high density polyethylenes generally have a density equal to or greater than 0.930 g/cm$^3$ and for the purpose of this invention are chosen from those having a fluidity index of between 0.5 and 50 g/10 minutes. Such high density polyethylenes are produced via Ziegler Natta type polymerisation processes.

Cross-Linking Agent

According to the invention the presence of a partial cross-linking agent allows structuring of the network formed by the α-olefin copolymers and the specific thermoplastic elastomer and therefore allows improvement of the composition's properties in terms of elastomer behaviour, hysteresis of the traction plots/stretching and impact resistance behaviour at low temperatures, including creep resistance, particularly when subjected to an increase in temperature under load.

The cross-linking agent which may be used for the production of the extruded composition, then intended to be changed into a moulded part, such as, for example, a cover for housing a motor vehicle safety airbag, is chosen from the group formed by the organic peroxides such as dicumyl peroxide, 1,1-di-t-butyl-3,3,5-trimethyl-cyclohexane, 2,5-dimethyl-2,5-di-t-butyl-peroxyhexane, 2,5-dimethyl 2,5-di-t-butyl-peroxyhexane-3, t-amyl peroxyethylhexonate, di-t-butylperoxide, di-(t-amyl) peroxide, 2,5-di (t-amyl peroxy)-2,5-dimethylhexane, le 2,5-di-(t-butylperoxy)-2,5-diphenylhexane, bis (α-methylbenzyl) peroxide, benzoyl peroxide, t-butylperbenzoate, 3,6,9-triethyl-3,6,9-trimethyl-1,4,7-triperoxonane and bis (t-butylperoxy)diisopropylbenzene, α-α-bis(t-butylperoxy)di-isopropylbenzene, t-butylperoxyketone and t-butyl peroxybenzoate, and by silanes, with one or the other type of cross-linking agent being able to be used singly or in a mixture.

The cross-linking agent is present in the composition at the amount of 0.1 to 3% by weight in relation to the total composition.

When peroxides are used, at least partial cross-linking of the composition takes place during the composition's blending extrusion phase at high temperatures and at controlled shearing rates.

Free Radical Initiator and Rheology Modifier

The composition according to the invention also comprises a rheology modifier agent or coagent chosen from the group comprising monomer type free radical initiator compositions, dimers, trimers or very low molecular weight polymers having reactive groups capable of creating free radicals by thermal decomposition. Such functional groups are, for example, the allyl groups, the vinyl groups and the methacrylate groups.

The mechanisms of chain splitting and chain branching in the non-crystalline zones generated by the action of the free radical initiator coagent allow a rheological modification of the composition, altering the molecular weight distribution without for all that substantially modifying the other morphological aspects. It is likely that the behaviour of the propylene based copolymer, the ethylene and α-olefin copolymer and the specific thermoplastic elastomer in the molten state are sufficiently different in the presence of the free radicals generated. The state of the art indicates that splits in chains are easy for polypropylenes and that these techniques are used to control the viscosity of such polymers. However, the presence of other polymers makes prediction of ultimate rheological behaviour complex for the composition according to the invention.

This coagent generates free radicals because it is very reactive. As soon as the free radicals are formed they will interact with the ethylene-α-olefin copolymers and partially cross-link the composition containing these polymers. The degradation of the propylene copolymer is reduced by the fact that a part of the free radicals is used for cross-linking the other components of the composition: also the cross-linking agent may be a cross-linking accelerator.

According to the invention, the free radical initiator coagent in accordance with the present application are chosen from the group of diallyl terephthalate, triallylcyanurate, triallylisocyanurate, 1,2polybutadiene, divinyl benzene, trimethylolpropanetrimethacrylate, polyethylene glycol dimethacrylate, ethylene glycol dimethacrylate, pentaerythritol triacrylate, allyl methacrylate, N N'-m-phenylene bismaleimide, toluenebismaleimide-p-quinone dioxime, nitrobenzene and diphenylguanidine.

Preferably the chosen rheology modifier coagents are triallylcyanurate, 1,2-polybutadiene, divinyl benzene and trimethylolpropane trimethacrylate (TMPTMA).

The rheology modifier coagent is added to the composition to the amount of 0.05% to 2% and preferably from 0.10% to 1.5% by weight of the total composition.

According to the invention, the composition comprises a stabilisation system. This stabilisation system is first of all photonic (anti-UV). The photonic stabiliser is chosen from amongst the HALS type products, i.e. amine with heavy steric bulk, benzophenones, benzotriazoles which may be used alone or in a mixture.

The heavy steric bulk amines are preferably chosen. Of these amines, the so-called polymeric amines have a molecular weight of about 2,000 g/mol, whereas the so-called monomeric amines have a molecular weight of the order of 500 g/mol.

This photonic stabilisation agent is incorporated to the amount of from 0.1% to 0.5% (1,000 to 5,000 ppm) by weight of the total composition.

This stabilisation system is also chemical (i.e. anti-oxidising). The antioxidants are of phenolic type (primary antioxidant), or of phosphites type (secondary antioxidant), used alone or blended.

The antioxidant is formulated specifically in quantity terms. The antioxidant is preferably present in a range of from 0.1% to 0.5% (1,000 to 5,000 ppm) by weight of the total formulation.

According to the invention the composition may also comprise 0.5% to 15% by weight of non-siliceous mineral filler, particularly of the calcium carbonate, talc, carbon black or titanium oxide type. However, the addition of fillers is a step in the wrong direction in relation to the problem of retaining the property of impact at low temperatures, but reduces the composition's cost. The addition of nanometric fillers of the lamellar clay type is also possible. Hence, whilst it is possible to incorporate filler into the composition of the present invention, preferably the composition contains no filler.

Finally, colorants in the form of mineral pigments or organic colorants may also be considered for incorporation in the composition.

Typically a polytetrafluoroethylene resin would not be used the present invention.

The components of the composition according to the invention are combined into a homogenous mixture by any suitable technique such as, for example, mixing extrusion (compounding). The composition's components are then blended in the form of granules or in powder form, according to the types of components, in a blender before plastification and homogenisation. Blending may be effected in a discontinuous process working with batches or in a continuous process. The components may be mixed, for example, in an internal mixer of Banbury type, in a single or twin-screw co-rotary or counter-rotary extruder, or in any other mixer capable of supplying sufficient energy to melt and fully homogenise the mixture. However, production of the mixture resulting from the composition may be done preferably by mixing extrusion (compounding) in a twin-screw extruder. In any event, special care must be paid to the control of temperatures and mixing (shear) conditions (screw profile and speed of rotation) in order to ensure the performance of the cross-linking agents and the rheology modifier coagents. Such a mixture must be a uniform and homogenous mixture.

The components may be incorporated in the mixture sequentially at any stage during the mixing operation or during the extrusion stage. Pre-determined quantities of cross-linking agent and free radicals initiator coagent may be injected into the extruder by the injection orifice downstream of the feed area by an appropriate pump.

Once mixed, the composition is extruded in pellets obtained by cutting under cooling water; the pellets, which will be stored for subsequent conversion into items and parts, in particular a cover intended to be fitted into the steering column or a dashboard or onto a door panel or any other area of the motor vehicle able to accommodate such an active safety device working by a bag inflated by a pyrotechnic mechanism. The conversion techniques used are those of plastics processing such as, in particular, injection if a cover is involved, and having very different wall thicknesses between the tear start zone and the support and fitting structural zone.

The composition in accordance with the present invention is used for producing the cover for the motor vehicle safety airbag for motor vehicles comprising zones designed to rupture and that must be able to tear under the influence of the airbag's instantaneous inflation without giving rise to fragmentation in other areas close to the tear zone designed to this end.

The rheological properties of the composition according to the invention are such that they allow the use of the composition in injection moulding machines for the production of parts comprising areas of very small thicknesses, of the order of a few tenths of a millimeter, and thus high shearing stress areas, without resulting in excessive injection pressure requirements, nor giving rise to areas of turbulence that generate orientations of materials likely to result in surface defects.

Rheological properties are expressed respectively by
the fluidity index measurement test measured under 2.16 kg at 230° C. in accordance with ISO standard 1133, but above all by,
the fill length measurement test, expressed in centimeters, of a spiral from an injection mould of specified section, this spiral being filled under controlled material injection pressure, material temperature and mould temperature conditions, with these conditions being clarified following an internal test.

One such composition in accordance with the invention provides equally the processing characteristics such that they enable the production of parts have an excellent surface finish such that the composition can be moulded at a high production rate from the short injection time and moreover short release time.

The parts produced from the composition in accordance with the present invention don't adhere to the mould surface thereby affecting the fast release of the moulded part.

EXAMPLES

Examples of the composition are described in the tables below, with the quantities of components being expressed as percentages by weight in relation to the total complete composition.

The polypropylene copolymers were respectively:
PPC 3660 from ATOFINA, with density 0.905 g/cm$^3$ measured in accordance with ISO standard 1183 (ASTM-1505) and fluidity index of 1.3 g/10 minutes measured in accordance with ISO standard 1133 (ASTM 1238) at 230° C. and under 2.16 kg of load. It is a heterophase copolymer with a melting point of 165° C. according to ISO standard 3146 and a cold temperature notched Izod impact resistance test, according to the standard ISO 180 of >50 kJ/m$^2$.

PPC 7810® (from ATOFINA, with density 0.905 g/cm$^3$ measured in accordance with ISO standard 1183 (ASTM-1505) fluidity index 15 g/10 minutes measured in accordance with ISO standard 1133 (ASTM 1238) at 230° C. and under 2.16 kg of load. It is a heterophase copolymer with impact resistance that is already high and a melting point of 165° C. according to ISO standard 3146 and a cold temperature notched Izod impact resistance test, according to the standard ISO 180 of >50 kJ/m$^2$.

PPC 9712® from ATOFINA, with density 0.905 g/cm$^3$ and fluidity index 25 g/10 minutes, measured in accordance with ISO standard 1133 at 230° C. and under 2.16 kg of load. It is a heterophase copolymer with slightly lower impact resistance than the previous copolymer on account of its greater fluidity, with a melting point of 165° C. according to ISO standard 3146 and a cold temperature notched Izod impact resistance test, according to the standard ISO 180 of >40 kJ/m$^2$.

PP 8013 L1 from EXXONMOBIL, with density 0.905 g/cm³ and fluidity index 8 g/10 minutes, melting point 163° C. and a cold temperature notched Izod impact resistance test, according to the standard ISO 180 of 50 kJ/m².

A polypropylene homopolymer was also tested as a comparative. It was PPH 100GA from ATOFINA, having a density of 0.905 g/cm³ and a fluidity index of 12 g/10 minutes and a melting point of 165° C. and a cold temperature notched Izod impact resistance test, according to the standard ISO 180 of 4 kJ/m²

Selected ethylene-butene copolymers obtained by copolymerisation of ethylene with a butene co-monomer or with an octene co-monomer in the presence of a so-called "constrained geometry" catalyst are commercially available in groups such as EXXON CHEMICAL COMPANY under the trademark EXACT®, DOW CHEMICAL COMPANY and DOW DUPONT ELASTOMERS under the trademarks AFFINITY® and ENGAGE®, as well as under the trademark TAFMER® of MITSUI CHEMICALS.

Ethylene-butene copolymers bearing the commercial designation Engage®:
ENR 7467 with 0.863 g/cm³ density and 1.0 g/10 minutes fluidity index, As well as ethylene-octene copolymers, with the commercial designation Engage®:
8842 with density 0.857 g/cm³ according to ASTM D-792 and fluidity index of 1.0 g/10 min according to ASTM D-1238
were used in different compositions.

Ethylene-octene copolymers with the commercial designation Tafmer® DF610 of density 0.862 g/cm³ according to ASTM D-792 and fluidity index of 1.0 g/10 min according to ASTM D-1238 were also tested.

Finally the ethylene-butene copolymers having the commercial designation of different densities and fluidity indexes were also tested for comparison ENGAGE® 8100 of density 0.870 g/cm³ and fluidity index of 1.0 g/10 minutes ENGAGE® 8130 of density 0.864 g/cm³ and fluidity index of 13.0 g/110 minutes ENGAGE® 8400 of density 0.870 g/cm³ and fluidity index of 30.0 g/10 minutes The chosen thermoplastic elastomer of the SBS type was Calprene® 501 of the DYNASOL ELASTOMERS Company. This elastomer is a thermoplastic copolymer Styrene/Butadiene/Styrene type whose butadiene and styrene contents are 69% and 31% respectively, (when measured according to the ASTM D-5775 method), polymerised in solution and having a linear structure. Its Shore A hardness is 76, measured in accordance with standard ASTM D-2240. Calprene® 501 has a high molecular weight when measured through its viscosity.

The thermoplastic elastomer of the SBS type chosen for comparative purposes was Calprene® 500 from DYNASOL ELASTOMERS. It also has a linear structure but its molecular weight is always lower when measured through its viscosity.

The molecular weights of Calprene® 500 and 501 are Mw=110,000 g/mole for Calprene® 500 and Mw=150,000 g/mole for Calprene® 501 respectively.

By way of comparative testing other thermoplastic elastomers were tested: These were SEEPS, which are polystyrene-b-poly(ethylene-ethylene/propylene)-b-polystyrenes, (b) designing the blocks. These materials are hydrogenated poly(styrene-b-isoprene/butadiene-b-styrene). Two different types of SEEPS were tested; Septon® 4033, with low molecular weight and Septon® 4055, with high molecular weight. These two thermoplastic elastomers are available from KURARAY CO LTD.

Another thermoplastic elastomer was also tested; this was SEBS (Styrene/ethylene/butadiene/styrene) sold under the name Tuftec® H1062 by ASAHI KASEI CHEMICAL CORP. The styrene content was 17.5% by weight.

The cross-linking agent used is an organic peroxide of the 2,5-Dimethyl-2,5-di(t-butylperoxy)hexane type, reference 101-XL-45, marketed under the trademark Luperox® by ATOFINA ARKEMA. Another agent was also tested, reference 101-PP-75, marketed under the trademark Luperox® by ATOFINA ARKEMA. This product contains for the most part 2,5-dimethyl-2,5-di(t-butylperoxy) hexane, but also 3,3,6,6-tetramethyl-1,2-dioxacyclohexane and di-tert-butyl peroxide.

Other cross-linking agents would have been quite possible, such as Luperox® F of ATOFINA ARKEMA, still of the bis (tertio-butylperoxyisopropyl)benzene type or of the tertio-butylcumylperoxyde type, for example reference Luperox® 801 or Trigonox® T of AKZO NOBEL CHEMICALS, or of di-tertio-butylperoxide type, for example reference Trigonox® B.

The rheology modification coagent used as a free radical initiator is a trimethylolpropane trimethacrylate (TMPTMA) in the form of master mixture on a calcium carbonate support at 70% by weight, commercially available under the ALCAN POUDRE TMPTMA 70® EP from SAFTIC ALCAN. Trimethylolpropane trimethacrylate is available from ATOFINA SR-350 (TMPTMA).

Other coagents which may be used such as trimethylolpropane trimethacrylate (SR-350 KD96 from SARTOMER Company Inc which may or may not be on a calcium silicate support or trially cyanurates from CYTEC INDUSTRIES INC. or 1,2-polybutadiene sold under the name RICON® 152D from SARTOMER CORPORATION which may again be alone or on a calcium silicate support.

A thermal stability agent Ultra-violet stabilisation was introduced to the composition. It was tris(2,4-ditert-butylphenyl) phosphite sold under the trademark Irgafos® 168 by CIBA SPECIALTY CHEMICALS.

Carbon black in the form of a master blend sold under the reference POLYBLAK® 1423 by A. SCHULMAN was added to the composition.

Implementation was effected on a Maris laboratory twin-screw extruder with 40 mm screw diameter equipped with eleven heating zones whose temperature instructions were set between 180° C. and 220° C.

The propylene based co-polymers, α-olefin polyethylenes, thermoplastic elastomers, cross-linking agents and rheology modifier coagents, as well as the different additives, were fed into the extruder's main input after being mixed in a slow mixer. A water-cooled head cutter device enabled pellets to be fabricated.

The essential characterisation properties of the composition according to the invention were respectively hardness expressed as Shore D in accordance with ISO standard 868, the fluidity index expressed in g/10 minutes under 2.16 kg at 230° C. respectively according to ISO standard 1133 (equivalent to ASTM 1238).

Rheological characterisation combining viscosity performance under a high shearing rate such as exists in an injection process was done by means of the spiral length test expressed in centimeters of fill of such a mould rather than by measurement of a fluidity index under higher load.

Sample test-pieces were produced from the composition according to the invention thus extruded and then granulated according to the accepted standards for fabricating test-pieces by injection.

The test and measurement conditions were those described in the ISO and ASTM standards with regard to mechanical tests, as well as traction properties, tensile strength and elongation at break at ambient temperature and at −35° C., (ISO R527, ASTM D 638, 20 mm/min traction speed), for the flexing modulus (ISO 178, ASTM D 790 2 mm/min), tearing, (ISO 34), and cold temperature Izod impact resistance properties on a notched test-piece, (ASTM D 256).

For the low temperature tests, the actual temperature of the sample was retained and in particular with the impact tests (notched Izod impact resistance test-pieces) were carried out at temperatures of −40° C., −45° C. and −50° C. respectively.

A correlation was determined leading to the conclusion that a non-rupture of a test-piece under notched impact at −45° C. allowed passage of the actual rupture tests for the safety airbag at −35° C. actual temperature and that a non-rupture under notched impact at −50° C. allowed passage with total safety of all the safety airbag rupture tests whatever the currently set temperature conditions.

Another correlation was worked out leading to the conclusion that a composition whose fluidity index under 2.16 kg at 230° C. of between 2 and 12 g/10 minutes combined with a spiral filling of between 20 and 50 centimeters allowed the meeting of requirements in respect of the ability to fill moulds and the surface appearance for such injected parts.

The experimental data set out in Table 1 show the performance differences in terms of cold temperature notched impact performance between a control composition (bearing reference 2a) not comprising thermoplastic elastomer and the composition according to the invention (bearing reference 1a). If resistance to cold temperature notched impact at −40° C. is equivalent in both instances, there is a large difference in favour of the composition according to the invention, i.e. with the thermoplastic elastomer present. The test-pieces made from a composition not containing thermoplastic elastomer will break suddenly when tested for notched impact resistance when cold measured at −45° C., whereas the test-pieces made from the composition containing a thermoplastic elastomer do not break.

The quantities of linear α-olefin polyethylenes are the same in both instances, 37% and 38% respectively, the cross-linking additives and the coagents are identical, but the percentage of polypropylene was reduced and replaced by the specific thermoplastic elastomer within the scope of the composition according to the invention. The fluidity index of the composition according to the invention is slightly lower, likewise resulting a smaller spiral length due to the composition's higher viscosity.

TABLE 1

EFFECT OF THE PRESENCE OF SBS

| | Composition number | |
| --- | --- | --- |
| | 1a | 2a |
| Variable | With SBS | Without SBS |
| PPC 3660 | 60.26 | 61.26 |
| ENGAGE 8842 | 34.00 | 37.00 |
| CALPRENE 501 | 4.00 | 0 |
| LUPEROX 101-XL-45 | 0.33 | 0.33 |
| ALCAN POUDRE TMPTMA 70 | 0.21 | 0.21 |

TABLE 1-continued

EFFECT OF THE PRESENCE OF SBS

| | Composition number | |
| --- | --- | --- |
| | 1a | 2a |
| IRGAFOS 168 | 0.20 | 0.2 |
| BLACK 1423 | 1.00 | 1.00 |
| Total | 100.00 | 100.00 |
| Critical properties | | |
| Shore D hardness | 42 | 40 |
| Fluidity index | 8.00 | 8.55 |
| Spiral length | 36.30 | 37.20 |
| Tensile Strength | 13.10 | 12.70 |
| Elongation at Break | 347.00 | 375.00 |
| Tear Strength | 84.50 | 85.60 |
| Flexing Modulus | 292.00 | 319.00 |
| Flexing Modulus −35° C. | 985.00 | 1,027.00 |
| Notched Izod Impact −40° C. | NB (71.35) | NB (71.7) |
| Notched Izod Impact −45° C. | NB (63.22) | 9C (10) Breaking Rupture |
| Notched Izod Impact −50° C. | 9C (10.5) Breaking Rupture | — |

NB, no rupture

Table 2 shows the effect of the percentage of SBS in the composition on both the resistance to impact of the energy absorbing material notched impact resistance at −45° C. and fluidity.

TABLE 2

EFFECT OF % OF SBS

| | Composition number | |
| --- | --- | --- |
| | 1a | 3a |
| Composition reference | PL20627 | PL20488 |
| SBS % Variable | 4% SBS | 6% SBS |
| PPC 3660 | 60.26 | 54.36 |
| ENGAGE 8842 | 34.00 | 38.00 |
| CALPRENE 501 | 4.00 | 6.00 |
| LUPEROX 101-XL-45 | 0.33 | 0.33 |
| LUPEROX 101 PP 7 5 | — | — |
| ALCAN POUDRE TMPTMA 70 | 0.21 | 0.21 |
| IRGAFOS 168 | 0.20 | 0.10 |
| BLACK 1423 | 1.00 | 1.00 |
| Total | 100.00 | 100.0 |
| Critical properties | | |
| Shore D hardness | 42 | 39 |
| Fluidity index | 8.00 | 4.5 |
| Spiral Length | 36.30 | 32.60 |
| Tensile Strength | 13.10 | 12.40 |
| Elongation at Break | 347.00 | 257.00 |
| Tear strength | 84.50 | 80.70 |
| Flexing Modulus | 292.00 | 237.00 |
| Flexing Modulus −35° C. | 985.00 | 786.00 |
| Notched Izod Impact −40° C. | NB (71.35) | NB (72) |
| Notched Izod Impact −45° C. | NB (63.22) | NB (68.6) |
| Notched Izod Impact −50° C. | 9C (10.5) Breaking Rupture | 9C (9) Breaking Rupture |

NB, no rupture

The experimental data collated in Table 3 show the influence of the molecular weight of the thermoplastic elastomer included in the composition according to the invention.

TABLE 3

EFFECT OF MOLECULAR WEIGHT OF THE THERMOPLASTIC ELASTOMER

| | Composition number | |
|---|---|---|
| | 3a | 4 |
| Composition reference | PL20488 | PL20487 |
| Variable | SBS high Mw | SBS low Mw |
| PPC 3660 | 54.36% | 54.36% |
| ENGAGE 8842 (E/B MFI 1, low density) | 38.00% | 38.00% |
| CALPRENE 501 (High Mw SBS) | 6.00% | |
| CALPRENE 500 (Low Mw SBS) | | 6.00% |
| LUPEROX 101-XL-45 | 0.33% | 0.33% |
| ALCAN POUDRE TMPTMA 70 | 0.21% | 0.21% |
| IRGAFOS 168 | 0.10% | 0.10% |
| BLACK 1423 | 1.00% | 1.00% |
| Total | 100.00% | 100.00% |
| Critical properties | | |
| Shore D Hardness | 39 | 40 |
| Fluidity index | — | — |
| Spiral Length | 32.6 | 33 |
| Tensile Strength | 12.4 | 12.8 |
| Elongation at break | 257 | 261 |
| Tear Strength | 80.7 | 81.9 |
| Flexing Modulus | 237 | 248 |
| Flexing Modulus −35° C. | 786 | — |
| Notched Izod Impact −40° C. | — | NB (54.2) |
| Notched Izod Impact −45° C. | NB (68.6) | Rupture |
| Notched Izod Impact −50° C. | Rupture | Rupture |

The use of a high molecular weight thermoplastic elastomer in the composition according to the invention makes it possible to ensure low temperature notched impact resistance. The thermoplastic elastomer considered in this test is SBS.

The experimental data collated in Table 4 show the effect of different types of thermoplastic elastomers it is possible to use, for example SBS, SEBS, SEEPS, and to do so in different molecular weights in the composition according to the invention. All percentages are identical for the composition's components. The thermoplastic elastomer is added at 4% in the three examples. The performance of the composition using the SBS of high molecular weight is clearly greater than the performance of the other two compositions using the other low molecular weight thermoplastic elastomers. It should be noted that the traction and tearing properties do not denote this type of difference in favour of the composition using the SBS with the higher molecular weight. In addition, the flow values in the injection conditions are quite comparable.

TABLE 4

EFFECT OF THE TYPE OF THERMOPLASTIC ELASTOMER

| | Composition number | | |
|---|---|---|---|
| | 5 | 6 | 1a |
| Variable | SEEPS | SEBS | SBS |
| PPC 3660 | 60.26% | 60.26% | 60.26% |
| ENGAGE 8842 (E/B MFI 1, Low density) | 34.00% | 34.00% | 34.00% |
| CALPRENE 501 (High Mw SBS) | | | 4.00% |
| SEPTON 4033 (Low Mw SEEPS) | 4.00% | | |
| TUFTEC H1062 (Low Mw SEBS) | | 4.00% | |
| LUPEROX 101-XL-45 | 0.33% | 0.33% | 0.33% |
| ALCAN POUDRE TMPTMA 70 | 0.21% | 0.21% | 0.21% |
| IRGAFOS 168 | 0.20% | 0.20% | 0.20% |
| BLACK 1423 | 1.00% | 1.00% | 1.00% |
| Total | 100.00% | 100.00% | 100.00% |
| Critical properties | | | |
| Shore D hardness | 40 | 42 | 42 |
| Fluidity index | — | — | — |
| Spiral Length | 36 | 36.1 | 35.3 |
| Tensile Strength | 12.8 | 13 | 13.1 |
| Elongation at Break | 332 | 428 | 347 |
| Tear Strength | 85.6 | 85 | 84.1 |
| Flexing Modulus | 303 | 312 | 292 |
| Flexing Modulus −35° C. | — | — | — |
| Notched Izod impact −40° C. | NB (72.62) | NB (73.39) | NB (71.35) |
| Notched Izod impact −45° C. | Rupture | Rupture | NB (63.22) |
| Notched Izod impact −50° C. | — | — | Rupture |

The experimental data collated in Table 5 show the mechanical resistance properties of test-pieces produced from compositions using different types of ethylene-α-olefin copolymers, ethylene-butene copolymers and ethylene-octene copolymers obtained by copolymerisation of ethylene with a co-monomer of butene or octene in the presence of a so-called "constrained geometry" catalyst according to their density and their fluidity index.

TABLE 5

EFFECT OF OCTENE OR BUTENE AS CO-MONOMER OF A-OLEFIN

| | Composition number | |
|---|---|---|
| | 7 | 8 |
| Variable | Butene | Octene |
| PPC 3660 | 54.36% | 54.36% |
| ENGAGE 8842 (E/B MFI 1, Low density) | 38.00% | |
| TAFMER DF610 (E/O MFI 1, Low density,) | | 38.00% |
| SEPTON 4033 (Low Mw SEEPS) | 6.00% | 6.00% |
| LUPEROX 101-XL-45 | 0.33% | 0.33% |
| ALCAN POUDRE TMPTMA 70 | 0.21% | 0.21% |
| IRGAFOS 168 | 0.10% | 0.10% |
| BLACK 1423 | 1.00% | 1.00% |
| Total | 100.00% | 100.00% |
| Critical properties | | |
| Shore D hardness | 38 | 37 |
| Fluidity index | — | — |
| Spiral Length | 35 | 33.7 |
| Tensile Strength | 12 | 11 |
| Elongation at Break | 255 | 141 |
| Tear Strength | 82.6 | 72 |
| Flexing Modulus | 290 | 244 |
| Flexing Modulus −35° C. | — | 830 |
| Notched Izod impact −40° C. | NB (68.4) | — |
| Notched Izod impact −45° C. | Rupture | NB (73.2) |
| Notched Izod impact −50° C. | — | Rupture |

In both instances the fluidity index of the α-olefin is 1 g/10 minutes, and the densities are low at 0.857 g/cm$^3$ for ethylene-butene and 0.863 g/cm$^3$ for ethylene-octene. It is observed that the crystallinity of the ethylene-butene is less than the crystallinity of the ethylene-octene at identical densities.

The experimental data collated in Table 6 show the results of using butene type α-olefins with different densities and fluidity indexes It is observed that a very high value fluidity index gives a reduction in performance of the utilisation of α-olefins having very high densities

TABLE 6

EFFECT OF THE DIFFERENT DENSITIES AND FLUIDITY INDEXES IN THE USE OF TYPE OF A OLEFINS OF BUTENE TYPE

| | Composition number | | | |
|---|---|---|---|---|
| | 3a | 9 | 10 | 11 |
| Variable: fluidity Index and density of the ethylene-butene | MFI 1, density 0.857 | MFI 1, density 0.870 | MFI 13, density 0.864 | MFI 30 density 0.870 |
| PPC 3660 | 54.36 | 54.36 | 54.36 | 54.36 |
| ENGAGE 8842 (EIB, MFI 1, Density 0.857) | 38.00 | | | |
| ENGAGE 8100(E/B, MFI 1, Density 0.870) | | 38.00 | | |
| ENGAGE 8130(E/B, MFI 13, Density 0.864) | | | 38.00 | |
| ENGAGE 8400(E/B, MFI 30, Density 0.870) | | | | 38.00 |
| CALPRENE 501 | 6.00 | 6.00 | 6.00 | 6.00 |
| LUPEROX 101-XL-45 | 0.33 | 0.33 | 0.33 | 0.33 |
| ALCAN POWDER TMPTMA 70 | 0.21 | 0.21 | 0.21 | 0.21 |
| IRGAFOS 168 | 0.10 | | | |
| BLACK 1423 | 1.00 | | | |
| Total | 100.00 | | | |
| Critical properties | | | | |
| Shore D hardness | 39.00 | | | |
| Fluidity index | — | | | |
| Spiral Length | 32.60 | | | |
| Tensile Strength | 12.40 | | | |
| Elongation at Break | 257.00 | | | |
| Tear Strength | 80.70 | | | |
| Flexing Modulus | 237.00 | | | |
| Flexing Modulus −35° C. | 786.00 | | | |
| Notched Izod Impact −40° C. | NB (72)- | Rupture | | Rupture |
| Notched Izod Impact −45° C. | NB (68.6) | Rupture | Rupture | Rupture |

This data shows that at equal densities but much higher fluidity index values there is a loss of impact resistance and that the choice of very low density results in high resistance to shock values The experiments depicted in Table 7 show results comparing compositions in accordance with the invention using different of propylene copolymers.

TABLE 7

EFFECT OF THE TYPE OF PROPYLENE BASED COPOLYMER

| | Composition number | | | | |
|---|---|---|---|---|---|
| | 3a | 9 | 10 | 11 | 20 |
| Variable type of propylene copolymers | PPC - MFI 1, 3, Pt fusion 165° C. Choc Izod (23° C.): >50 kJ/m² | PPC - MFI 8, Pt fusion 163° C. Choc Izod (23° C.): 50 kJ/m² | PPC - MFI 15, Pt fusion 165° C. Choc Izod (23° C.): >50 kJ/m² | PPC - MFI 25, Pt fusion 165° C. Choc Izod at 23° C.: >40 kJ/m² | PPC - MFI 12, Pt fusion 165° C. Choc Izod at 23° C.: 4 kJ/m² |
| PPC 8013 | | 54.36 | | | |
| PPH 100GA 12 | | | | | 54.36 |
| PPC 3660 | 54.36 | | | | |
| PPC 7810 | | | 54.36 | | |
| PPC 9712 | | | | 54.36 | |
| ENGAGE 8842 (E/B, MFI 1, Density 0.857) | 38.00 | 38.00 | 38.00 | 38.00 | 38.00 |
| CALPRENE 501 | 6.00 | 6.00 | 6.00 | 6.00 | |
| ALCAN POWDER TMPTMA 70 | 0.21 | 0.21 | 0.21 | 0.21 | |

TABLE 7-continued

EFFECT OF THE TYPE OF PROPYLENE BASED COPOLYMER

| | Composition number | | | | |
|---|---|---|---|---|---|
| | 3a | 9 | 10 | 11 | 20 |
| IRGAFOS 168 | 0.10 | 0.10 | 0.10 | 0.10 | 0.10 |
| BLACK 1423 | 1.00 | 1.00 | 1.00 | 1.00 | 1.00 |
| Total | 100.00 | 100.00 | 100.00 | 100.00 | 100.00 |
| Critical properties | | | | | |
| Shore D hardness | 39.00 | 34.00 | 32.00 | 35.00 | |
| Fluidity index | — | 5.63 | 5.89 | 7.33 | |
| Spiral Length | 32.60 | 34.51 | 32.98 | 34.99 | |
| Tensile Strength | 12.40 | 9.00 | 9.60 | 10.60 | |
| Elongation at break | 257.00 | 339.00 | 338.00 | 408.30 | |
| Tear Strength | 80.70 | 59.80 | 63.30 | 68.20 | |
| Flexing Modulus | 237.00 | 175.00 | 165.00 | 212.00 | |
| Flexing Modulus −35° C. | 786.00 | | | | |
| Notched Izod Impact −40° C. | | | | | Rupture |
| Notched Izod Impact −45° C. | NB (68.6) | NB (74.6) | NB (73.6) | NB 69.5 | Rupture |
| Notched Izod Impact −45° C. | 9C (9) Rupture Casante | P(72) 4 Ch(20) Partial ductile Rupture | 9C (13.7) Breaking Rupture | 90 (18.4) Rupture Breaking | Rupture |

The results with a propylene based homopolymer clearly show a weakness to impact at low temperatures of such compositions. The results with polypropylene based copolymers give resistance values using the Choc Izod at ambient temperature of >40 kJ/m² showing the differences also show the differences in the energy absorbed by the materials.

The effects of the cross-linking system are illustrated in Tables 8, 9 and 10

TABLE 8

EFFECT OF TYPE OF CROSS-LINKING AGENT

| | Composition number | |
|---|---|---|
| | 12 | 13 |
| PP8013 | 54.54 | 52.69 |
| ENGAGE 8842 | 38.00 | 38.00 |
| CALPRENE 501 | 6.00 | 6.00 |
| LUPEROX 101-XL-45 | 0.15 | — |
| LUPEROX 101 PP 7 5 | — | 2.00 |
| ALCAN POUDRE TMTMA 70 | 0.21 | 0.21 |
| IRGAFOS 168 | 0.10 | 0.10 |
| BLACK 1423 | 1.00 | 1.00 |
| Total | 100.00 | 100.00 |
| Critical properties | | |
| Shore D hardness | 33.00 | 32.00 |
| Fluidity index | 3.65 | 3.98 |
| Spiral Length | 31.75 | 30.46 |
| Tensile Strength | 10.20 | 10.30 |
| Elongation at Break | 238.00 | 202.00 |
| Tear Strength | 88.90 | 69.40 |
| Flexing Modulus | 138.00 | 187.00 |
| Flexing Modulus −35° C. | — | — |
| Notched Izod Impact −40° C. | — | — |
| Notched Izod Impact −45° C. | NB (71.1) | NB (74) |
| Notched Izod Impact −50° C. | NB (71.2) | NB (71) |

TABLE 9

EFFECT OF % OF CROSS-LINKING AGENT

| | Composition number | | |
|---|---|---|---|
| | 9 | 12 | 14 |
| Variable | 0.33% cross-linking agent | 0.15% cross-linking agent | 0.1% cross-linking agent |
| PP8013 | 54.36 | 54.54 | 54.59 |
| ENGAGE 8842 | 38.00 | 38.00 | 38.00 |
| CALPRENE 501 | 6.00 | 6.00 | 6.00 |
| LUPEROX 101-XL-45 | 0.33 | 0.15 | 0.10 |
| ALCAN POUDRE TMPTMA 70 | 0.21 | 0.21 | 0.21 |
| IRGAFOS 168 | 0.10 | 0.10 | 0.10 |
| BLACK 1423 | 1.00 | 1.00 | 1.00 |
| Total | 100.00 | 100.00 | 100.00 |
| Critical properties | | | |
| Shore D hardness | 34.00 | 33.00 | 35.00 |
| Fluidity index | 5.63 | 3.65 | 3.67 |
| Spiral Length | 34.51 | 31.75 | 31.19 |
| Tensile strength | 9.00 | 10.20 | 10.70 |
| Elongation at Break | 339.00 | 238.00 | 202.00 |
| Tear Strength | 59.80 | 88.90 | 71.10 |
| Flexing Modulus | 175.00 | 138.00 | 200.00 |
| Flexing Modulus −35° C. | — | — | — |
| Notched Izod Impact −40° C. | — | — | — |
| Notched Izod Impact −45° C. | NB (74.6) | NB (71.1) | NB (73.2) |
| Notched Izod Impact −50° C. | P (72) 4Ch (20) Partial ductile rupture | NB (71.2) | NB (68.8) |

TABLE 10

EFFECT OF % OF CROSS-LINKING AGENT AND COAGENT

| | Composition number | | | |
|---|---|---|---|---|
| | 15 | 16 | 17 | 18 |
| PP8013 | 54.20 | 54.35 | 54.35 | 54.50 |
| ENGAGE 8842 | 38.00 | 38.00 | 38.00 | 38.00 |
| CALPRENE 501 | 6.00 | 6.00 | 6.00 | 6.00 |
| LUPEROX 101-XL-45 | 0.40 | 0.40 | 0.25 | 0.25 |
| ALCAN POUDRE TMTMA 70 | 0.30 | 0.15 | 0.30 | 0.15 |
| IRGAFOS 168 | 0.10 | 0.10 | 0.10 | 0.10 |
| BLACK 1423 | 1.00 | 1.00 | 1.00 | 0.00 |
| Total | 100.00 | 100.00 | 100.00 | 100.00 |
| Critical properties | | | | |
| Shore D hardness | 37.00 | 39.00 | 39.00 | 38.00 |
| Fluidity index | 4.50 | 5.80 | 3.00 | 3.80 |
| Spiral Length | 32.00 | 32.80 | 30.60 | 30.60 |
| Tensile strength | 12.70 | 12.10 | 13.40 | 13.00 |
| Elongation at break | 378.00 | 314.00 | 153.00 | 207.00 |
| Tear strength | 76.40 | 77.80 | 84.20 | 81.50 |
| Flexing Modulus | 206.00 | 245.00 | 266.00 | 256.00 |
| Flexing Modulus −35° C. | — | — | — | — |
| Notched Izod Impact −40° C. | — | — | — | — |
| Notched Izod Impact −45° C. | NB (67) | NB (64.7) | NB (71.1) | NB (68.7) |
| Notched Izod Impact −50° C. | 9C (11.2) Breaking Rupture | 9C (10) Breaking Rupture | 9C (9.7) Breaking Rupture | 9C (16) Breaking Rupture |

The invention claimed is:

1. An injection moulded part made from a partly cross-linked polyolefin thermoplastic elastomer composition comprising by weight of the total composition:
   a) 50 to 80% by weight of at least one propylene based polymer selected from the group of propylene-ethylene copolymers, propylene-α-olefin copolymers, and propylene-ethylene-α-olefin copolymers, having an impact resistance of at least 30 kJ/m$^2$ measured using the notched Izod impact resistance test at 23° C. in accordance with ISO standard 180;
   b) 25 to 50% by weight of at least one copolymer of ethylene and at least one α-olefin, the ethylene-α-olefin copolymer having a maximum density of 0.870 g/cm$^3$ in accordance with ISO standard 1183; and
   c) 1 to 15% by weight of at least one thermoplastic elastomer comprising a styrene-butadiene-styrene (SBS) material;
   wherein the SBS material of the thermoplastic elastomer c) has a viscosity average molecular weight between 150,000 g/mole and 200,000 g/mole.

2. An injection moulded part according to claim 1, further comprising a cross-linking agent selected from the group of dicumyl peroxide, 1,1-di-t-butyl-3,3,5-trimethyl-cyclohexane, 2,5-dimethyl-2,5-di-t-butyl-peroxyhexane, 2,5-dimethyl-2,5-di-t-butyl-peroxyhexane, α-α-bis(t-butylperoxy) di-isopropylbenzene, t-butyl-peroxyketone, and t-butyl peroxybenzoate.

3. An injection moulded part according to claim 2, wherein the cross-linking agent is present in said composition in an amount of from 0.1 to 3% by weight of the total composition.

4. An injection moulded part according to claim 1, wherein the propylene based polymer contains from 2 to 5% by weight of ethylene.

5. An injection moulded part according to claim 1, wherein the propylene based polymer has a fluidity index of between 0.1 and 100 g/10 min according to the ASTM D-1238 method at 190° C. under a load of 2.16 kg.

6. An injection moulded part according to claim 1, wherein the propylene based polymer is a propylene-α-olefin copolymer formed by the combination of propylene with at least one α-olefin having from 4 to 12 carbon atoms.

7. An injection moulded part according to claim 6, wherein the α-olefin is selected from the group of 1-butene, 1-pentene, 1-hexene, 1-octene, and methyl pentene.

8. An injection moulded part according to claim 1, wherein the ethylene-α-olefin copolymer is formed from an α-olefin comprising between 3 and 12 atoms of carbon.

9. An injection moulded part according to claim 1, wherein the ethylene-α-olefin copolymer is an ethylene-butene copolymer or an ethylene-octene copolymer.

10. An injection moulded part according to claim 1, wherein the ethylene-α-olefin copolymer has a fluidity index of between 0.5 and 50 g/10 min-according to the ASTM D-1238 method at 190° C. under a load of 2.16 kg.

11. An injection moulded part according to claim 1, wherein the ethylene-α-olefin copolymer is an ethylene-butene copolymer or ethylene-octene copolymer having a fluidity index of between 0.5 and 50 g/10 min according to the ASTM D-1238 method at 190° C. under a load of 2.16 kg.

12. An injection moulded part according to claim 1, wherein the ethylene-α-olefin copolymer is copolymerized with a comonomer selected from the group of vinyl acetate, acrylic acid, methacrylic acid, methyl acrylate, methyl methacrylate, ethylacrylate, and ethyl methacrylate.

13. An injection moulded part according to claim 1, wherein the ethylene-α-olefin copolymer is mixed with a copolymer of ethylene and a comonomer selected from the group of vinyl acetate, acrylic acid, methacrylic acid, methyl acrylate, methyl methacrylate, ethylacrylate, and ethyl methacrylate.

14. An injection moulded part according to claim 1, further comprising a high density polyethylene, a free radical initiator, a photonic stabilising agent, a chemical stabilising agent, and a mineral filler.

15. An injection moulded part according to claim 14, wherein the high density polyethylene is present in an amount of 5% to 30% by weight of the total composition and has a density of equal to or greater than 0.930 g/cm$^3$ and a fluidity index of between 0.5 and 50 g/10 min according to the ASTM D-1238 method at 190° C. under a load of 2.16 kg.

16. An injection moulded part according to claim 14, wherein the free radical initiator is selected from the group of polymers comprising the reactive groups allyl, vinyl, methacrylate, diallyl terephthalate, triallylcyanurate, triallylisocyanurate, 1,2 polybutadiene, divinyl benzene, trimethylolpropanetrimethacrylate, polyethylene glycol dimethacrylate, ethylene glycol dimethacrylate, pentaerythritol triacrylate, allyl methacrylate, N N'-m-phenylene bismaleimide, toluenebismaleimide-p-quinone dioxime, nitrobenzene, and diphenylguanidine, and is present in an amount of 0.05% to 2% by weight of the total composition.

17. An injection moulded part as set forth in claim 1 further defined as a cover for housing a motor vehicle safety airbag, wherein the cover is made from the partly cross-linked polyolefin thermoplastic elastomer composition.

18. An injection moulded part as set forth in claim 17 wherein the cover is adapted to be opened by controlled tearing in order to allow the airbag to be deployed upon ignition of a pyrotechnic system.

19. An injection moulded part as set forth in claim 18 wherein the cover is free of fragments during rupture at low temperature.

* * * * *